United States Patent
Lavelle et al.

(10) Patent No.: US 10,394,820 B2
(45) Date of Patent: Aug. 27, 2019

(54) CONSTRUCTING AND QUERYING A BLOOM FILTER TO DETECT THE ABSENCE OF DATA FROM ONE OR MORE ENDPOINTS

(71) Applicant: INTERNATIONAL BUSINESS MACHINES CORPORATION, Armonk, NY (US)

(72) Inventors: Andrew Lavelle, Galway (IE); Claude Warren, Galway (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 338 days.

(21) Appl. No.: 15/358,223

(22) Filed: Nov. 22, 2016

(65) Prior Publication Data
US 2018/0144031 A1    May 24, 2018

(51) Int. Cl.
*G06F 17/30*    (2006.01)
*G06F 16/2455*    (2019.01)

(52) U.S. Cl.
CPC .... *G06F 16/24564* (2019.01); *G06F 16/2455* (2019.01)

(58) Field of Classification Search
CPC ........... G06F 16/2471; G06F 16/24555; G06F 16/2456; G06F 16/2282; G06F 16/24544; G06F 16/24564
USPC ........................................................ 707/754
See application file for complete search history.

(56) References Cited

U.S. PATENT DOCUMENTS

| 8,266,506 | B2 | 9/2012 | Hao et al. |
| 8,359,316 | B2 | 1/2013 | Franke |
| 8,666,989 | B1 | 4/2014 | Gilliam |
| 9,372,892 | B1 * | 6/2016 | Chainani ............. G06F 16/2471 |
| 9,501,527 | B1 * | 11/2016 | Chainani ............. G06F 16/2471 |

(Continued)

FOREIGN PATENT DOCUMENTS

| CN | 102195866 B | 5/2014 |
| RU | 201201682 A | 7/2013 |

OTHER PUBLICATIONS

List of IBM Patents or Patent Applications Treated as Related; (Appendix P), Filed Apr. 19, 2018; 2 pages.

(Continued)

*Primary Examiner* — Jean M Corrielus
(74) *Attorney, Agent, or Firm* — Cantor Colburn LLP; Scott Dobson

(57) ABSTRACT

A computer-implemented method includes constructing an overall Bloom filter representing a set of legal parameter values of a plurality of parameters useable for querying one or more endpoints. In the overall Bloom filter, each parameter of the plurality of parameters is offset based on a respective unique identifier of the parameter. A first set of desired parameter values is determined corresponding to first desired data to be retrieved from a first endpoint of the one or more endpoints. Using a computer processor, a first query Bloom filter is constructed representing the first set of desired parameter values. A first Bloom filter search is performed of the first query Bloom filter against the overall Bloom filter. Responsive to not finding a match through the first Bloom filter search, it is opted not to query the first endpoint with the first set of desired parameter values.

14 Claims, 4 Drawing Sheets

(56) References Cited

U.S. PATENT DOCUMENTS

| | | | |
|---|---|---|---|
| 9,872,337 B2 | 1/2018 | Ayach et al. | |
| 2006/0072582 A1* | 4/2006 | Bronnimann | H04L 12/2854 370/395.32 |
| 2013/0132408 A1 | 5/2013 | Little | |
| 2013/0166576 A1* | 6/2013 | Hudzia | G06F 17/3033 707/754 |
| 2014/0067830 A1 | 3/2014 | Buhler et al. | |
| 2014/0195720 A1 | 7/2014 | Akella et al. | |
| 2014/0274752 A1 | 9/2014 | Blume et al. | |
| 2014/0280337 A1 | 9/2014 | Vuong et al. | |
| 2014/0280155 A1 | 12/2014 | Elliot et al. | |
| 2016/0098487 A1 | 4/2016 | Kim et al. | |
| 2016/0154861 A1* | 6/2016 | Hegerty | G06F 17/30554 707/728 |
| 2017/0070492 A1* | 3/2017 | Rubin | G06F 17/30312 |
| 2018/0060593 A1* | 3/2018 | Abraham | G06F 17/30867 |

OTHER PUBLICATIONS

Steven S. Shuman et al., "Building and Using an Atomic Key with Partial Key Searching Capability," U.S. Appl. No. 15/196,332, filed Jun. 29, 2016.
List of IBM Patents or Patent Applications Treated as Related; (Appendix P), Filed Feb. 13, 2017); 2 pages.

\* cited by examiner

CONSTRUCTING AND QUERYING A BLOOM FILTER TO DETECT THE ABSENCE OF DATA FROM ONE OR MORE ENDPOINTS

BACKGROUND

Embodiments of the present invention relate to bloom filters and, more specifically, to constructing and querying a bloom filter to detect the absence of data from one or more endpoints.

In many cases, a web site or other client needs to obtain data from various application endpoints, where each endpoint is a point in the client's application at which the client obtains data from a remote source. For instance, the endpoint may be a web socket, at which JavaScript or other code is used to obtain data. For example, to render a web page, the client may need to contact another website to provide information needed for the web page. In that case, the other website may act as the endpoint.

SUMMARY

According to an embodiment of this disclosure, a computer-implemented method includes constructing an overall Bloom filter representing a set of legal parameter values of a plurality of parameters useable for querying one or more endpoints. In the overall Bloom filter, each parameter of the plurality of parameters is offset based on a respective unique identifier of the parameter. A first set of desired parameter values is determined corresponding to first desired data to be retrieved from a first endpoint of the one or more endpoints. Using a computer processor, a first query Bloom filter is constructed representing the first set of desired parameter values. A first Bloom filter search is performed of the first query Bloom filter against the overall Bloom filter. Responsive to not finding a match through the first Bloom filter search, it is opted not to query the first endpoint with the first set of desired parameter values.

In another embodiment, a system includes a memory having computer readable instructions and one or more processors for executing the computer readable instructions. The computer readable instructions include constructing an overall Bloom filter representing a set of legal parameter values of a plurality of parameters useable for querying one or more endpoints. In the overall Bloom filter, each parameter of the plurality of parameters is offset based on a respective unique identifier of the parameter. Further according to the computer readable instructions, a first set of desired parameter values is determined corresponding to first desired data to be retrieved from a first endpoint of the one or more endpoints. A first query Bloom filter is constructed representing the first set of desired parameter values. A first Bloom filter search is performed of the first query Bloom filter against the overall Bloom filter. Responsive to not finding a match through the first Bloom filter search, it is opted not to query the first endpoint with the first set of desired parameter values.

In yet another embodiment, a computer program product for using a Bloom filter to detect potential existence of data includes a computer readable storage medium having program instructions embodied therewith. The program instructions are executable by a processor to cause the processor to perform a method. The method includes constructing an overall Bloom filter representing a set of legal parameter values of a plurality of parameters useable for querying one or more endpoints. In the overall Bloom filter, each parameter of the plurality of parameters is offset based on a respective unique identifier of the parameter. Further according to the method, a first set of desired parameter values is determined corresponding to first desired data to be retrieved from a first endpoint of the one or more endpoints. A first query Bloom filter is constructed representing the first set of desired parameter values. A first Bloom filter search is performed of the first query Bloom filter against the overall Bloom filter. Responsive to not finding a match through the first Bloom filter search, it is opted not to query the first endpoint with the first set of desired parameter values.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

When performing its assigned tasks, such as loading a web page, a client can hit numerous endpoints. The number of endpoints a client hits can vary widely based on the client's design. Querying and retrieving data from endpoints is network heavy, as it requires both constructing a connection for each endpoint and then the transmitting data back and forth between the client and the endpoint. In some cases, the result of such a network connection may be learning that the data requested is not available from the queried endpoint. In such cases, costly network traffic is wasted and can clog the network. This waste can potentially occur each time an endpoint is queried.

Turning now to an overview of aspects of the present invention, some embodiments are filtering systems that construct a Bloom filter usable by the client to determine whether data may be available at an endpoint. In some embodiments, a single Bloom filter may be used to determine possible availability for multiple endpoints. Thus, not only can some network traffic be avoided, as compared to conventional systems for querying endpoints, but also this result can be achieved without the cost of searching many Bloom filters.

Figure 1:
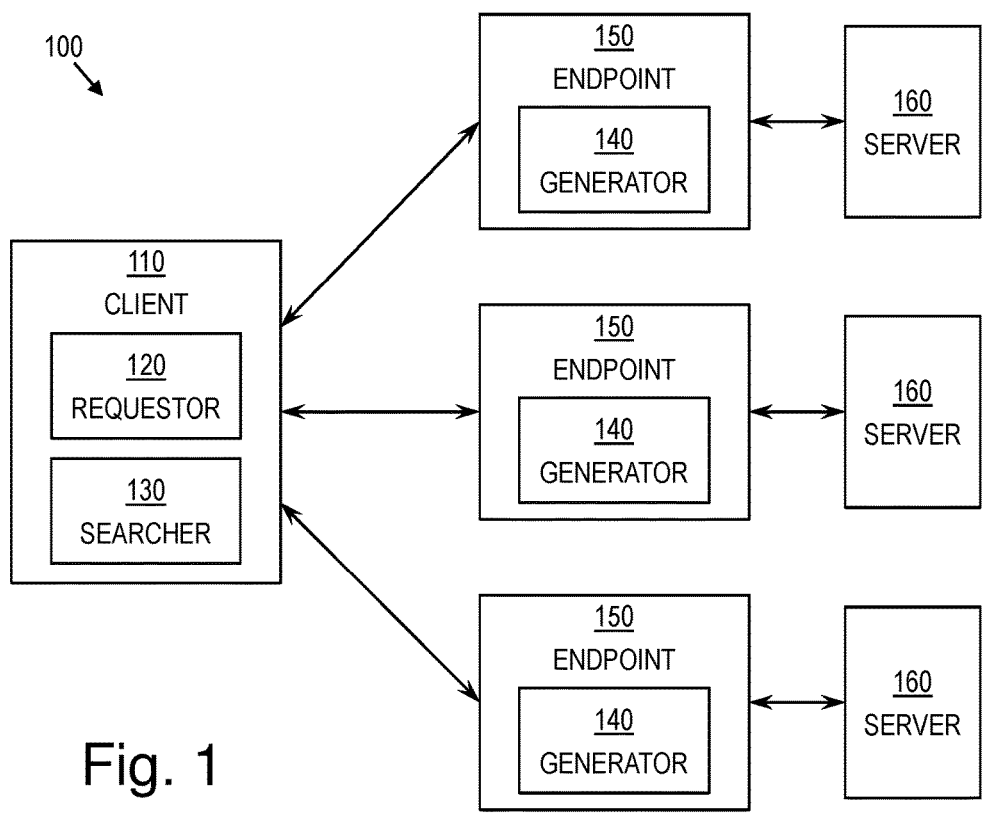
FIG. 1 is a block diagram of a filtering system, according to some embodiments of this invention.

FIG. 1 is a block diagram of a filtering system 100, according to some embodiments of this invention. As shown in FIG. 1, the filtering system 100 may be in communication with, or integrated with, a client 110 and one or more endpoints 150 accessible by the client 110. The client 110 may be, for example, a web site or other client application or client device. Each endpoint 150 may be a source that the client 110 can query for data. For example, and not by way of limitation, an endpoint 150 may be a web socket in communication with a corresponding server 160.

In some embodiments, the filtering system 100 may include a requestor 120 and a searcher 130, which may reside at or in communication with the client 110, as well as a generator 140, which may reside at or in communication with each endpoint 150. Each of the requestor 120, the searcher 130, and the generator 140 may include hardware, software, or a combination of both. Further, these components need not be divided as shown for illustrative purposes. Rather, for example, the requestor 120 and the searcher 130 may share hardware or software in some embodiments.

Conventionally, the client 110 is designed to perform some set of operations, which require it to occasionally query endpoints 150 and thereby query their corresponding servers 160. For example, and not by way of limitation, the client 110 may service a website used for performing medical research and thus the client 110 may occasionally query endpoints 150 having access to specialized medical data. The client 110 may query and receive specialized medical data from such an endpoint 150 and may analyze, arrange, and load the specialized data onto its website. More specifically, when querying an endpoint 150, the client may do so with one or more parameter values corresponding to one or more parameters usable to search the endpoint 150 in question. For example, given the website described above, the client 110 might query an endpoint 150 with a parameter value representing all search terms provided by a user.

According to some embodiments, a Bloom filter may be constructed that enables the filtering system 100 to determine whether desired data potentially exists at an endpoint 150. Generally, a Bloom filter is a data structure, such as an array, used to enable fast searching that may return false positives, but not false negatives. Bloom filters are generated through hashing, and thus searching also requires hashing and can, therefore, be performed quickly. If a Bloom filter match is not found for certain parameter values, the client 110 knows that the desired data corresponding to those parameter values is not available at the endpoint 150, and the client 110 may, therefore, preserve resources by not querying the endpoint 150. However, before such a Bloom filter can be searched, it may first be constructed.

Figure 2:
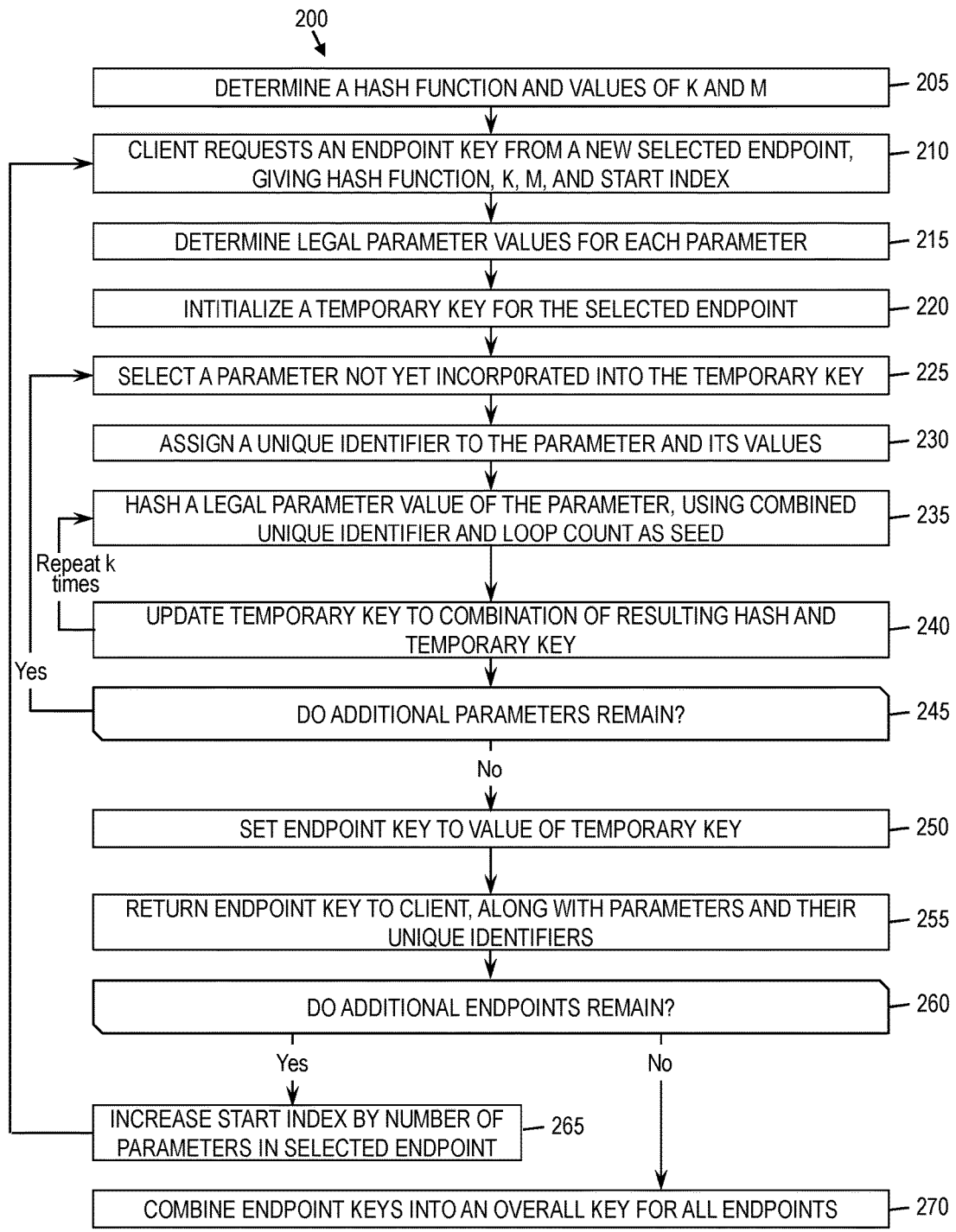
FIG. 2 is a flow diagram of a method for constructing a Bloom filter representing two or more endpoints, according to some embodiments of this invention.

FIG. 2 is a flow diagram of a method 200 for constructing a Bloom filter representing two or more endpoints 150, according to some embodiments of this invention. From each endpoint 150, the requestor 120 may request an endpoint key, which may be a Bloom filter representing a set of legal parameter values at that endpoint 150. According to this disclosure, a legal parameter value is a parameter value that corresponds to data existing at the endpoint 150. Thus, generally, querying an endpoint 150 with a parameter value that is not legal will yield no results.

In some embodiments, the design of an endpoint key may be determined by the client 110 and may thus meet requirements, if any, that the client 110 has. To this end, at block 205, the client 110 may determine a hash function to be used, a value of a variable m, which may be the number of bits used to represent an endpoint key, as well as a value of a variable k, which may be the number of active bits for each parameter represented in the endpoint key. Various techniques known in the art of Bloom filters may be used to determine specific values of both m and k to meet design requirements.

At block 210, the client may request an endpoint key from a selected endpoint 150 whose endpoint key has not yet been determined. This request may include the desired characteristics of the endpoint key, specifically, the hash function and the values of k and m, as well as a start index. For example, and not by way of limitation, the searcher 130 may establish a rest call through which these variables are passed to the endpoint 150.

At the selected endpoint 150, the generator 140 may generate an endpoint key complying with the Bloom filter characteristics received from the client 110. To this end, at block 215, the generator 140 may identify a subset of legal parameter values associated with each parameter usable to query the selected endpoint 150. Each endpoint 150 may be aware of which parameter values are legal (i.e., correspond to existing data). For instance, these parameter values may be stored accessible to the selected endpoint 150, or the selected endpoint 150 may be able to search its data to determine the set of legal parameter values.

At block 220, the generator 140 may initialize a temporary key for the endpoint 150, such as to a value of 0, in preparation for determining the endpoint key. As mentioned above, the endpoint 150 may be associated with one or more parameters. The generator 140 may iterate over these parameters. For each parameter associated with the endpoint 150, the associated subset of legal parameter values may be incorporated into the temporary key based in part on a unique identifier of the parameter.

In some embodiments, the unique identifiers of the parameters are numerical, such as integers, where each parameter's unique identifier is incremented (e.g., by 1) from a previously assigned unique identifier. For example, and not by way of limitation, each parameter across the various endpoints 150 may be selected one at a time, starting with a first parameter of a first endpoint. The first parameter may be assigned an identifier equal to a base value, such as 0 or 1, and each subsequent parameter selected may be assigned an identifier incremented by a value, such as 1, over the identifier assigned to the prior selected property. The start index passed to each endpoint 150 by the client 110 may indicate a starting point for unique identifiers to be assigned to parameters associated with that endpoint 150. It will be understood that, because an endpoint 150 may be associated with multiple parameters, the number of parameters and thus the number of unique identifiers may exceed the number of endpoints 150.

At block 225, the generator 140 may select a parameter not yet incorporated into the temporary key. At block 230, the generator 140 may assign a unique identifier to the selected parameter and, thus, to the legal parameter values of that parameter. For example, this unique identifier may be the start index, a value of which was received from the client 110. After assigning the unique identifier, the generator 140 may increment the start index, so that the next parameter considered is assigned a different unique identifier.

At block 235, the generator 140 may hash a legal parameter value of the parameter, using a seed based on a loop count at the unique identifier.

To this end, the filtering system 100 may maintain a loop count for a loop associated with the selected parameter. For example, and not by way of limitation, a variable i used as the loop count may begin with a value of 1 and may be incremented after each time the legal parameter value is hashed. The generator 140 may hash a legal parameter value associated with the selected parameter once per loop. Specifically, in some embodiments, the hash function supplied by the client 110 may be applied to the legal parameter value, using a seed based on the current loop count and the unique identifier of the legal parameter value. For instance, the hash function may be applied to the legal parameter value using a seed of the current loop count plus the unique identifier.

After each hash is performed on the parameter, at block 240, the temporary key may be updated to be the result of the hash performed combined with the current value of the temporary key. For example, and not by way of limitation, a logical OR may be performed on the hash and the temporary key, and the result may be stored back into the temporary key. Blocks 235 and 240 may be repeated until the legal parameter value of the selected parameter has been hashed k times. Further, in some embodiments, if multiple parameter values are legal for the selected parameter, the one or more other legal parameter values may also be hashed k times and logically ORed with the temporary key as described above.

When all k hashes have been performed for the one or more legal parameter values of the parameter, and have been incorporated into the temporary key, then at decision block 245, it may be determined whether additional parameters remain to be incorporated into the temporary key. If another such parameter exists, then the generator 140 may return to block 225 to select another parameter. However, if all parameters have been considered, then at block 250, the endpoint key may be set to the value of the temporary key.

In some embodiments, various combinations of parameter values of the various parameters may be deemed legal. For instance, it may be known that a first value of a parameter is a legal parameter value only when combined with other parameter values in the other parameters. In other words, specific combinations of parameter values may be legal, while other combinations may not be. In this case, a respective endpoint key may be determined for each such combination of legal parameter values, and thus each endpoint may be associated with at least one endpoint key.

In some embodiments, as a result of each parameter having a unique identifier, the various seeds used for the hash functions applied to the legal parameter values are offset by the differences between the numerical unique identifiers. For instance, suppose a first parameter has a unique identifier of 1 and a second parameter has a unique identifier of 2. In that case, the initial seed used for the first hash for the first parameter may be 2, while the initial seed used for the first hash for the second parameter may be 3. In this example, the difference between these initial seeds is 1 because the difference between the unique identifiers of the first and second parameters is 1.

As a result of these distinct initial seeds, each parameter may determine a k-bit pattern within the endpoint key. The endpoint key may be an m-bit vector, and the k-bit pattern within this vector corresponding to a first parameter may have both its position and value determined by the first parameter. More specifically, the position of the k-bit pattern corresponding to the first parameter may be based on the unique identifier of the first parameter, and the value may be based on the legal parameter values of the first parameter. The various k-bit patterns representing the various properties of the endpoint key set may overlap within the m total bits of the endpoint key. Further, as will be described later, the various endpoint keys of various endpoints can be effectively combined because of the varying starting indices used. Among other aspects, the use of these varying initial seeds may distinguish the endpoint keys described in this disclosure from conventional keys.

Given the above, the endpoint key may incorporate each of the legal parameter values for each parameter of the endpoint 150. Thus, the endpoint key may be atomic in the sense that it may be a single, unsegmented key, yet the key may incorporate multiple parameters.

At block 255, the endpoint 150 may return the endpoint key to the client 110, along with a list of the parameters incorporated into the endpoint key, and along with an indication of the unique identifier of each parameter. For example, in some embodiments, since the client 110 already knows the start index used by the endpoint 150, the endpoint 150 may simply return its parameters ordered based on the assignment of their unique identifiers. The client 110 can then infer the unique identifier of each parameter based on the start index provided to the endpoint 150 and the placement of the parameter in order.

At decision block 260, it may be determined whether additional endpoints 150 exist for which an endpoint key has not yet been obtained. If so, then at block 265, the start index may be increased by the number of parameters in the currently selected endpoint 150. Further, in this case, the method 200 may return to block 210 to request an endpoint key from another endpoint 150.

If all endpoint keys have been obtained, then at block 270, the various endpoint keys from the various endpoints 150 may be combined into an overall key, which may also be Bloom filter. In some embodiments, this overall key may be stored at the client 110. For example, the endpoints 150 may be logically ORed together to form the overall key, which may represent the legal parameter values of the parameters of the various endpoints 150. Because each parameter had a unique identifier, even compared across endpoints 150, each parameter may have a distinct offset in the Bloom filter. These offsets may be preserved in the overall key Due to the structure described above, the overall key may be searched for a parameter value of a specific parameter to determine whether that parameter value is potentially a legal parameter value. This is in contrast to conventional Bloom filters that represent multiple values. With such conventional Bloom filters, a Bloom filter search indicates whether the value is present in the Bloom filter, but no more information is provided. According to the present invention, however, Bloom filter searching can be specific to certain parameters. In other words, if various parameters can take the same value, but the client requires a match of that value specifically in a first parameter, then the query key can be constructed to search for that value specifically at the first parameter. As a result, more refined searching may be performed, and the filtering system 100 may further reduce resources spent querying endpoints as compared to a situation where a conventional Bloom filter is used.

During normal operation of the client 110, the client may encounter an endpoint 150 and may desire to retrieve data from that endpoint 150, where the desired data corresponds to a set of desired parameter values. The client 110 may then perform a Bloom filter search on the overall key, using the desired parameter values, to determine whether the desired data possibly exists at endpoint 150. To this end, the searcher 130 may construct a query key, which may be a Bloom filter, based on the desired parameter values.

Figure 3:
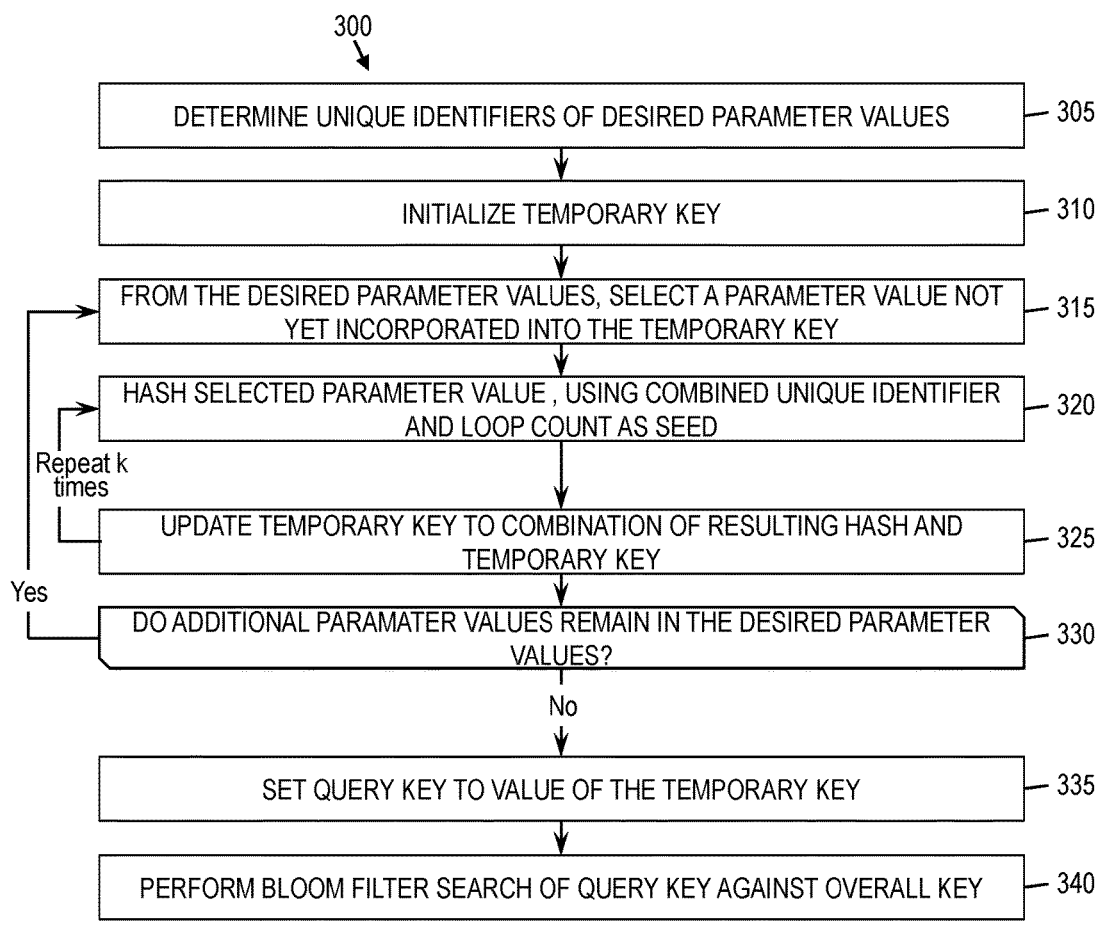
FIG. 3 is a flow diagram of a method for constructing a Bloom filter used to determine whether data might exist at a given endpoint, according to some embodiments of this invention.

FIG. 3 is a flow diagram of a method 300 for constructing a Bloom filter used to determine whether data might exist at a given endpoint, according to some embodiments of this invention.

At block 305, the searcher 130 may determine the unique identifiers associated with the desired parameter values, which are the unique identifiers of the applicable parameters.

This determination may be based on the data returned from the endpoint 150 in question when constructing the overall key.

At block 310, a temporary key may be assigned an initial value, such as a value of 0. The searcher 130 may iterate over the desired parameter values, incorporating each one into the temporary key based on the unique identifier associated with the desired parameter value. To this end, at block 315, a parameter value not yet incorporated into the temporary key may be selected from the desired parameter values.

At block 320, as performed when building each endpoint key, the selected parameter value of the desired parameter values may be hashed with a seed based on a loop count and the unique identifier of the selected parameter value. At block 325, the hash may be combined with the temporary key to update the temporary key. Blocks 320 and 325 may be repeated until the selected parameter value has been hashed k times.

At decision block 330, it may be determined whether any additional parameter values exist in the desired parameter values that have not yet been incorporated into the temporary key. If such a parameter value exists, then the method 300 may return to block 315 to select a new parameter value. When all parameter values of the desired parameter values have been incorporated, then at block 335, the query key may be set to the value of the temporary key. Analogously to the overall key, each parameter value may be represented in the query key at an offset that may be determined by the associated unique identifier of the applicable parameter.

After the query key is determined, at block 340, the searcher 130 may perform a Bloom filter search using the query key against the overall key. As is conventionally the case with Bloom filter searches, the results of such a search may represent potential matches, rather than definite matches. Thus, in this case, if the query key is identified as part of the overall key by way of the Bloom filter search, then the desired parameter values may possibly be legal parameter values of the endpoint 150. If the query key is not found in the overall key by way of the Bloom filter search, then in some embodiments, the desired parameter values are not legal parameter values, and the endpoint 150 has no data corresponding to the desired parameter values.

If no match is found, the client 110 need not query the endpoint 150 with the desired parameter values to retrieve the corresponding desired data because it may be known that no such data exists. However, if a match is found, in some embodiments, the client 110 queries the endpoint 150 with the desired parameter values. In this manner, the filtering system 100 may avoid some queries to endpoints 150 during normal operation, thus reducing network traffic and other resource use.

In some embodiments, the overall key may be updated on demand to keep up with data modification at the endpoints 150. For instance, in some embodiments, the client 110 may monitor the endpoints 150 for changes, or the endpoints 150 may notify the client 110 of changes to their data. The client 110 may then request an updated endpoint key from each endpoint 150 for which a change is detected. The overall key may then be updated based on the updated endpoint key.

Figure 4:
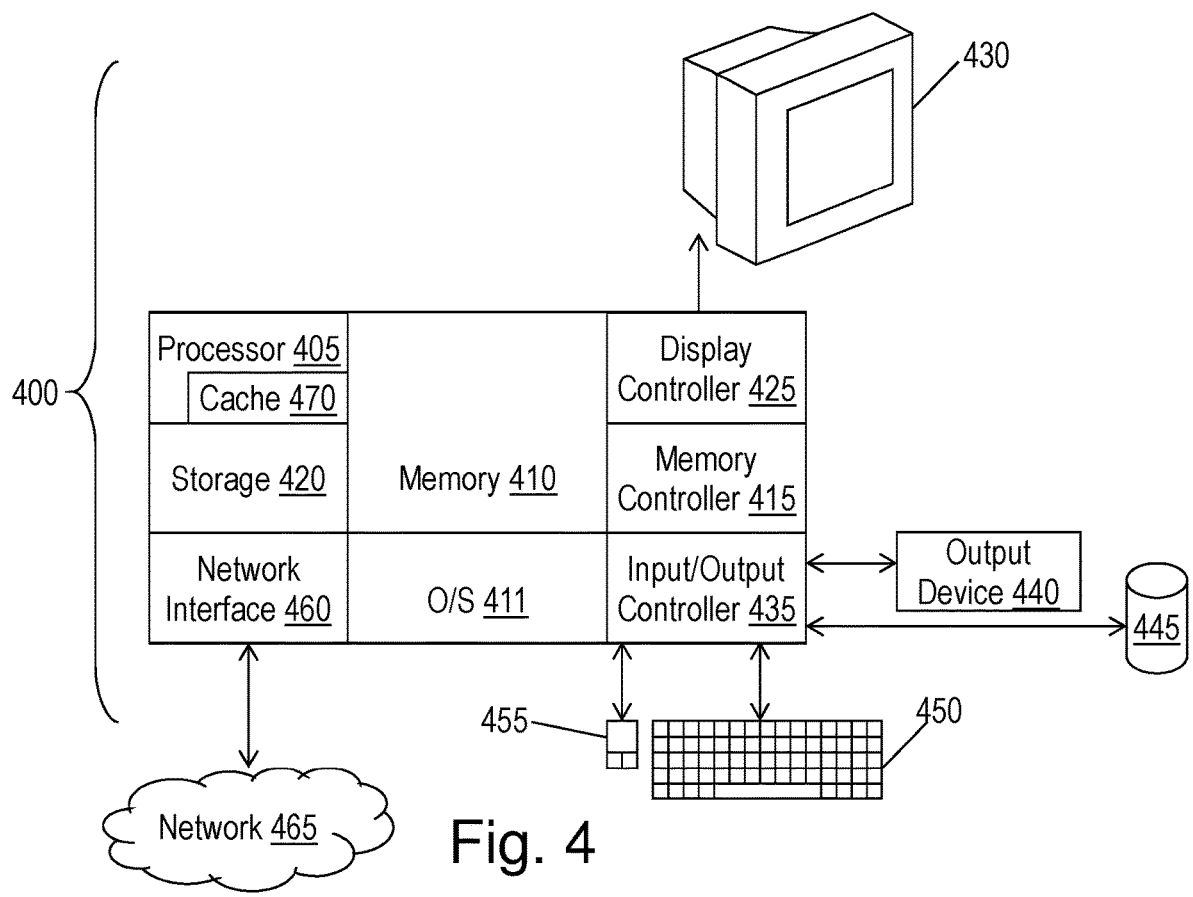
FIG. 4 is a block diagram of a computer system for implementing some or all aspects of the filtering system, according to some embodiments of this disclosure.

FIG. 4 illustrates a block diagram of a computer system 400 for use in implementing a filtering system 100 or method according to some embodiments. The filtering systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the filtering systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Filtering systems 100 and methods according to this disclosure may be embodied, in whole or in part, in computer program products or in computer systems 400, such as that illustrated in FIG. 4.

Technical effects and benefits of some embodiments include the ability to reduce network traffic and other resource use when desiring to query an endpoint 150. Specifically, a client 110 can build a Bloom filter representing data available at one or multiple endpoints 150. During regular operation of the client 110, the client may perform a Bloom filter search before querying an endpoint 150 to determine whether the endpoint 150 may have data desired.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining one or more characteristics of an overall Bloom filter representing a set of legal parameter values of a plurality of parameters useable for querying one or more endpoints, wherein in the overall Bloom filter, each parameter of the plurality of parameters is offset based on a respective unique identifier of the parameter, wherein the determining the characteristics of the overall Bloom filter comprises determining a hash function, a number of bits used to represent each endpoint Bloom filter, and a number of active bits for each parameter represented in each endpoint key;
    requesting from each endpoint of the one or more endpoints a respective endpoint Bloom filter having the one or more characteristics and representing legal parameters values of the endpoint, wherein each request includes the determined hash function, the number of bits used to represent a corresponding Bloom filter and the number of active bits for each parameter;
    receiving one or more endpoint Bloom filters from the one or more endpoints, wherein in each endpoint Bloom filter, each parameter of the plurality of parameters is offset based on the respective unique identifier of the parameter;
    combining the one or more endpoint Bloom filters into the overall Bloom filter;
    determining a first set of desired parameter values corresponding to first desired data to be retrieved from a first endpoint of the one or more endpoints;
    constructing, by a computer processor, a first query Bloom filter representing the first set of desired parameter values;
    performing a first Bloom filter search of the first query Bloom filter against the overall Bloom filter; and
    responsive to not finding a match through the first Bloom filter search, opting not to query the first endpoint with the first set of desired parameter values.

2. The computer-implemented method of claim 1, further comprising:
    determining a second set of desired parameter values corresponding to second desired data to be retrieved from the first endpoint of the one or more endpoints;
    constructing a second query Bloom filter representing the second set of desired parameter values;
    performing a second Bloom filter search of the second query Bloom filter against the overall Bloom filter; and
    responsive to finding a match through the second Bloom filter search, querying the first endpoint with the second set of desired parameter values.

3. The computer-implemented method of claim 1, wherein the combining the one or more endpoint Bloom filters into the overall Bloom filter preserves a respective offset of each parameter of the plurality of parameters in the one or more endpoint Bloom filters.

4. The computer-implemented method of claim 1, wherein in the first query Bloom filter, each parameter of the plurality of parameters is offset based on the respective unique identifier of the parameter.

5. The computer-implemented method of claim 1, further comprising updating the overall Bloom filter on demand.

6. A system comprising:
    a memory having computer readable instructions; and one or more processors for executing the computer readable instructions, the computer readable instructions comprising:
  determining one or more characteristics of an overall Bloom filter representing a set of legal parameter values of a plurality of parameters useable for querying one or more endpoints, wherein in the overall Bloom filter, each parameter of the plurality of parameters is offset based on a respective unique identifier of the parameter, wherein the determining the characteristics of the overall Bloom filter comprises determining a hash function, a number of bits used to represent each endpoint Bloom filter, and a number of active bits for each parameter represented in each endpoint key;
  requesting from each endpoint of the one or more endpoints a respective endpoint Bloom filter having the one or more characteristics and representing legal parameters values of the endpoint, wherein each request includes the determined hash function, the number of bits used to represent a corresponding Bloom filter and the number of active bits for each parameter;
  receiving one or more endpoint Bloom filters from the one or more endpoints, wherein in each endpoint Bloom filter, each parameter of the plurality of parameters is offset based on the respective unique identifier of the parameter;
  combining the one or more endpoint Bloom filters into the overall Bloom filter;
  determining a first set of desired parameter values corresponding to first desired data to be retrieved from a first endpoint of the one or more endpoints;
  constructing a first query Bloom filter representing the first set of desired parameter values;
  performing a first Bloom filter search of the first query Bloom filter against the overall Bloom filter; and
  responsive to not finding a match through the first Bloom filter search, opting not to query the first endpoint with the first set of desired parameter values.

7. The system of claim 6, the computer readable instructions further comprising:
  determining a second set of desired parameter values corresponding to second desired data to be retrieved from the first endpoint of the one or more endpoints;
  constructing a second query Bloom filter representing the second set of desired parameter values;
  performing a second Bloom filter search of the second query Bloom filter against the overall Bloom filter; and
  responsive to finding a match through the second Bloom filter search, querying the first endpoint with the second set of desired parameter values.

8. The system of claim 6, wherein the combining the one or more endpoint Bloom filters into the overall Bloom filter preserves a respective offset of each parameter of the plurality of parameters in the one or more endpoint Bloom filters.

9. The system of claim 6, wherein in the first query Bloom filter, each parameter of the plurality of parameters is offset based on the respective unique identifier of the parameter.

10. The system of claim 6, the computer readable instructions further comprising updating the overall Bloom filter on demand.

11. A computer-program product for using a Bloom filter to detect potential existence of data, the computer program product comprising a computer readable storage medium having program instructions embodied therewith, the program instructions executable by a processor to cause the processor to perform a method comprising:
  determining one or more characteristics of an overall Bloom filter representing a set of legal parameter values of a plurality of parameters useable for querying one or more endpoints, wherein in the overall Bloom filter, each parameter of the plurality of parameters is offset based on a respective unique identifier of the parameter, wherein the determining the characteristics of the overall Bloom filter comprises determining a hash function, a number of bits used to represent each endpoint Bloom filter, and a number of active bits for each parameter represented in each endpoint key;
  requesting from each endpoint of the one or more endpoints a respective endpoint Bloom filter having the one or more characteristics and representing legal parameters values of the endpoint, wherein each request includes the determined hash function, the number of bits used to represent a corresponding Bloom filter and the number of active bits for each parameter;
  receiving one or more endpoint Bloom filters from the one or more endpoints, wherein in each endpoint Bloom filter, each parameter of the plurality of parameters is offset based on the respective unique identifier of the parameter;
  combining the one or more endpoint Bloom filters into the overall Bloom filter;
  determining a first set of desired parameter values corresponding to first desired data to be retrieved from a first endpoint of the one or more endpoints;
  constructing a first query Bloom filter representing the first set of desired parameter values;
  performing a first Bloom filter search of the first query Bloom filter against the overall Bloom filter; and
  responsive to not finding a match through the first Bloom filter search, opting not to query the first endpoint with the first set of desired parameter values.

12. The computer-program product of claim 11, the method further comprising:
  determining a second set of desired parameter values corresponding to second desired data to be retrieved from the first endpoint of the one or more endpoints;
  constructing a second query Bloom filter representing the second set of desired parameter values;
  performing a second Bloom filter search of the second query Bloom filter against the overall Bloom filter; and
  responsive to finding a match through the second Bloom filter search, querying the first endpoint with the second set of desired parameter values.

13. The computer-program product of claim 11, wherein the combining the one or more endpoint Bloom filters into the overall Bloom filter preserves a respective offset of each parameter of the plurality of parameters in the one or more endpoint Bloom filters.

14. The computer-program product of claim 11, wherein in the first query Bloom filter, each parameter of the plurality of parameters is offset based on the respective unique identifier of the parameter.

* * * * *